United States Patent
Rüb

(10) Patent No.: US 8,910,659 B2
(45) Date of Patent: Dec. 16, 2014

(54) HYDRAULIC VALVE DEVICE

(75) Inventor: Winfried Rüb, Waldshut-Tiengen (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 985 days.

(21) Appl. No.: 12/737,241

(22) PCT Filed: Jun. 27, 2009

(86) PCT No.: PCT/EP2009/004663
§ 371 (c)(1),
(2), (4) Date: Jan. 27, 2011

(87) PCT Pub. No.: WO2010/000423
PCT Pub. Date: Jan. 7, 2010

(65) Prior Publication Data
US 2011/0126920 A1 Jun. 2, 2011

(30) Foreign Application Priority Data

Jul. 4, 2008 (DE) .......................... 10 2008 031 745

(51) Int. Cl.
| | |
|---|---|
| F16K 31/12 | (2006.01) |
| F16K 31/383 | (2006.01) |
| F15B 13/01 | (2006.01) |
| F16K 31/122 | (2006.01) |
| F15B 13/04 | (2006.01) |
| F15B 13/042 | (2006.01) |

(52) U.S. Cl.
CPC ............. *F16K 31/383* (2013.01); *F15B 13/015* (2013.01); *F16K 31/1221* (2013.01); *F16K 31/1225* (2013.01); *F16K 31/12* (2013.01); *F15B 13/0402* (2013.01); *F15B 13/0405* (2013.01); *F15B 13/042* (2013.01)
USPC ............. 137/596.14; 137/596.18; 137/596.2; 91/445; 91/454

(58) Field of Classification Search
CPC ....................................... F16K 31/12
USPC .................... 137/596.14, 596.18, 596.2, 485; 91/454, 445, 448
See application file for complete search history.

(56) References Cited

U.S. PATENT DOCUMENTS 2,468,245 A * 4/1949 Stevens ......................... 123/378
3,667,502 A * 6/1972 Otto ............................ 137/624.14
(Continued)

FOREIGN PATENT DOCUMENTS

| DE | 103 25 294 A1 | 12/2004 |
| GB | 540 596 A | 10/1941 |
| GB | 721 645 A | 1/1955 |
| GB | 865 419 A | 4/1961 |

*Primary Examiner* — John K Fristoe, Jr.
*Assistant Examiner* — Christopher Ballman
(74) *Attorney, Agent, or Firm* — Roylance, Abrams, Berdo and Goodman LLP

(57) ABSTRACT

A hydraulic valve device has a valve housing (10) in which an activating piston (16) is guided in a movable manner. The activating piston (16) is actuatable by an actuating device (18) and activates a pilot valve (20) to connect a fluid port (T) in the valve housing (10) to a fluid chamber (22) of a shut-off piston (24). The shut-off piston (24) activates at least one fluid-conducting connecting line (1, 2) of the valve device and has a fluid conducting control line (26) opening from the connecting line (1, 2) into the fluid chamber (22) of the shut-off piston (24).

10 Claims, 3 Drawing Sheets

(56) References Cited

U.S. PATENT DOCUMENTS

| | | | | |
|---|---|---|---|---|
| 3,924,656 A | * | 12/1975 | Hanser et al. | 137/596.14 |
| 4,093,002 A | * | 6/1978 | Tardy | 137/596.2 |
| 5,024,248 A | * | 6/1991 | Kubo | 137/596.16 |
| 5,351,601 A | * | 10/1994 | Zeuner et al. | 91/445 |
| 5,878,647 A | * | 3/1999 | Wilke et al. | 91/445 |
| 6,192,936 B1 | * | 2/2001 | Dawson | 137/625.6 |
| 2002/0029810 A1 | * | 3/2002 | Zenker et al. | 137/596.2 |
| 2007/0163662 A1 | * | 7/2007 | Reilly et al. | 137/625.61 |
| 2007/0284003 A1 | * | 12/2007 | Hansen et al. | 137/269 |
| 2008/0099713 A1 | * | 5/2008 | Fritts | 251/325 |
| 2010/0224804 A1 | * | 9/2010 | Sneh | 251/30.01 |

\* cited by examiner

HYDRAULIC VALVE DEVICE

FIELD OF THE INVENTION

The invention relates to a hydraulic valve device having a valve housing with a pilot piston of a pilot valve. The pilot piston can be actuated by an actuating device and can be moved in the direction of the valve seat of the valve housing by a first energy storage device. The pilot piston can connect a fluid port in the valve housing to a fluid chamber of a shut-off piston of a shut-off valve which activates at least one fluid-carrying connecting line of the valve device. A fluid-carrying control line discharges from the connecting line into the fluid chamber of the shut-off piston which can be moved in the direction of a second valve seat by a second energy storage device.

BACKGROUND OF THE INVENTION

The hydraulic valve device according to the invention can be generically categorized as one of pilot-operated check valves which interact largely with directional valves and which are used to control a load. To initiate unblocking of the check valve, either an auxiliary pressure is connected via the directional valve, or the activating pressure of the directional valve is used directly. The auxiliary or activating pressure is then used as a striking pressure to open a pilot valve to relieve the back of the shut-off piston. The load pressure in the working port then acts continuously on an annular surface on the shut-off piston and is opposed to the spring force of the now unloaded back. The activation piston of the pilot valve can then be oriented such that after opening of the pilot valve it also presses the shut-off piston in the opening direction. The activation piston of the pilot valve therefore presses from the side of the fluid-carrying, channel-shaped connecting line to the directional control valve on the respective shut-off piston to open a pilot valve from the spring chamber of the shut-off piston into the connecting channel connected to the return of the entire valve device in this operating state.

Therefore, a throttled connection between the load side and the back via which a continuous control oil flow drains via the pilot valve to the low pressure or tank port of the device during unblocking. Then the hydraulic consumer connected to the respective operating port under load decreases by this leakage flow without the possibility of exerting any influence on the control piston with the control slide generally in the form of a control piston. Accordingly, two fundamental control concepts are distinguished:
1. The control oil is routed into the return channel of the hydraulic device via the control piston. In the neutral position, the control piston establishes throttled relief to the shut-off piston so that it can be placed clearly on its pertinent valve seat without an oil volume being clamped between the valve seat and the control piston. For unblocking at very low loads, the throttled relief must be opened as far as possible so that the load pressure can also lift the shut-off piston. To be able to cover all conceivable load cases, major relief must be chosen which leads to the minimum speed being high when starting up with high loads. This operation is perceived as being unsafe.
2. The control oil is connected past the control piston directly to the leak port or a return port R. The relief throttle on the control piston for the shut-off piston can be chosen to be very small because relief of the back of the shut-off piston is independent of precision control of the control slide. However, the large control oil flow through the pilot valve is disadvantageous under high loads.

The smallest required lowering flow can be assumed to be about 1 l/min. The leakage flow, depending on the design and level of the load pressure, can assume a multiple thereof and thus is no longer acceptable. In particular, the connected machine can no longer be controlled with sufficient precision in the precision control range at high pressures.

In practice, various solutions are known for actuating the activation piston on the pilot valve. Mutual striking is mechanically simple under the action of the inflow pressure. However, for leading loads, the inflow pressure can collapse, and a cycle of closing and opening of the shut-off piston begins, accompanied by jerky movements of the connected hydraulic device. Improvement of operation yields an opening pressure independent of load in the form of the activating pressure for the control piston or control slide. This structure, however, leads to complicated channel routing within the valve device, and the activation piston sitting in the middle of the valve has a long control axis. This structure is accompanied by an increase in the overall size of the valve (WO 2006/105765 A1).

DE 199 19 014 A1 discloses another valve device with a pilot-controlled check valve for activating two working ports. In this known solution, the working pressure of the working port, which is under the inflow pressure, presses on the check valve of the opposite side. In the case of the leading loads, the inflow pressure then drops to the atmospheric pressure, and the striking pressure can collapse. As a result, the check valve closes, and the hydraulic consumer can shut down. In this case, the inflow pressure in turn rises spontaneously, and the check valve opens and accelerates the load until it leads again. The described control period then starts again from the beginning.

U.S. Patent Publication No. 2002/0029810 A1 discloses a valve device in which unblocking is initiated via the control piston. A pilot valve lying transversely to the axis of the control piston is used. The pilot valve arranged transversely in this way must be connected to the assigned connecting lines in a mechanically difficult manner that increases the valve installation height by a considerable amount. To increase production reliability, that pilot valve is supported in an independent sleeve of the valve device.

DE 10 2005 033 577 A1 describes in turn pilot valves which are mechanically struck. To reduce the transverse force on the control piston, the pilot valves are not axially actuated, but are tilted in the manner of a pivoting motion. Mechanical unlocking is ready for operation in a possible failure of the hydraulic energy. The technical mechanical effort for triggering the pilot valves, however, is considerable, especially because an additional attachment housing must be provided which bears the pilot valves and a thin connecting bore must be routed from the respective check valve to the opposite side.

DE 103 25 294 A1 discloses a generic valve device in the manner of a hydraulic control arrangement for activation of a consumer independently of the load. The valve device has a housing section, preferably made as a valve disk, in which a continuously adjustable directional valve controls the flow of the pressurized fluid to the consumer and to which an individual pressure compensator is assigned. At least one shut-off valve is located in the flow path of the pressurized fluid between the directional valve and the consumer and can be unblocked to enable flow of the pressurized fluid from the assigned consumer port. Via a replenishment valve, pressurized fluid from the tank can be replenished when the consumer is undersupplied. In the known solution, the shut-off valve is piloted via a pilot valve whose axis runs perpendicular to the axis of the directional valve. The shut-off valve is located axially parallel to the directional control. The pilot valve then is mechanically openable via a valve slide of the directional valve. Because the axis of the pressure limiting and replenishment valve runs perpendicular to the axes of the directional valve and of the pilot valve, the known solution is characterized by particular compactness, with all essential components necessary in a LUDV system being accommodated with minimum installation space.

SUMMARY OF THE INVENTION

An object of the invention is to provide an improved valve device being mechanically simple in structure, having a compact design, being reliable in operation and ensuring that leading loads cannot adversely affect unblocking.

This object is basically achieved by a hydraulic valve device characterized in that the pilot piston of the pilot valve and the shut-off piston of the shut-off valve are guided within the valve housing to be able to move parallel to one another and in that the pilot piston and the shut-off piston can be moved in opposite directions relative to their respective valve seats by the action of at least one of the two energy storage devices. The seat-sealed pilot valve used with its pilot piston relieves the back of the shut-off piston toward the tank and not, as in the known solutions, toward the control piston axis. The pilot valve is activated by the unlocking pressure in the fluid activation line. This unlocking pressure Y is independent of the load, and preferably is applied by an actuating device. Accordingly, the unblocking is not adversely affected by leading loads. Instead of the unlocking pressure Y, the actuating device can also use an actuating magnet for activating the activation piston.

The pilot valve is located in a space-saving manner on the back of the shut-off piston and on its middle axis such that its seat-sealed pilot piston projects into the spring chamber of the shut-off piston. The activating or striking piston of the pilot valve is therefore supported in the valve housing along the return valve axis. Since the opening stroke of the pilot valve is greater than that of the shut-off piston, reliable operation is ensured.

The pilot-operated check valve in the form of the hydraulic valve device is located axially parallel to the control piston so that space-saving installation within the directional valve is possible. Furthermore, secondary leak flows via the control line do not occur to increase operating reliability.

Especially preferred, the pilot-operated check valve is provided with a double seat-sealed function. The additional seat-sealed check valve is installed in the shut-off piston such that it opens from the inflow channel into the spring chamber. In this way, the inflow pressure in the spring chamber of the main shut-off piston can be represented and prevents the shut-off piston from opening unintentionally. Only when the seat-sealed pilot valve formed by the activation piston with a pilot valve on the back is actively opened can the shut-off piston also open in the flow direction. This arrangement also results in improved closing and passively holding closed for the valve device. So that a leak oil flow does not flow from the spring chamber provided with inflow pressure into the load space while being held closed with the shut-off piston, the throttle site to the load space is provided with an additional valve device with a valve part preferably in the form of a closing ball. The valve device opens in flow from the load space into the spring chamber of the shut-off valve. When the double seat-sealed shut-off piston is closed, the necessary displacement volume can furthermore flow into the spring chamber. Conversely, a leak in the outflow direction (for example, toward a steering cylinder) cannot occur. Thus, the valve device is tight in both possible throughflow directions.

This configuration is advantageously used for safety applications, which generally require redundant control concepts.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure which are schematic and not to scale.

DETAILED DESCRIPTION OF THE INVENTION

Figure 1:
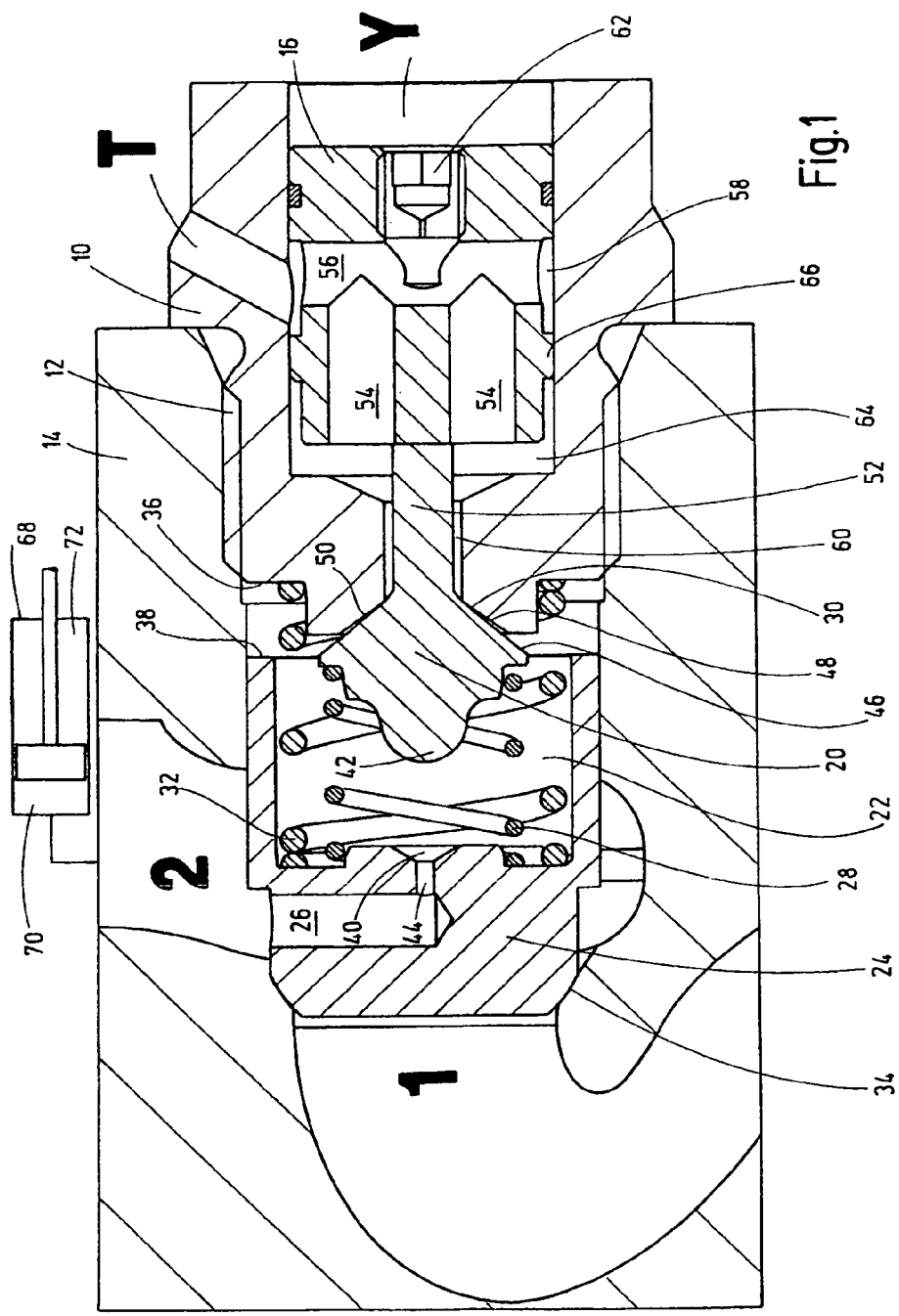
FIG. 1 is a side elevational view in section of a hydraulic valve device according to a first exemplary embodiment of the invention.
Figure 3:
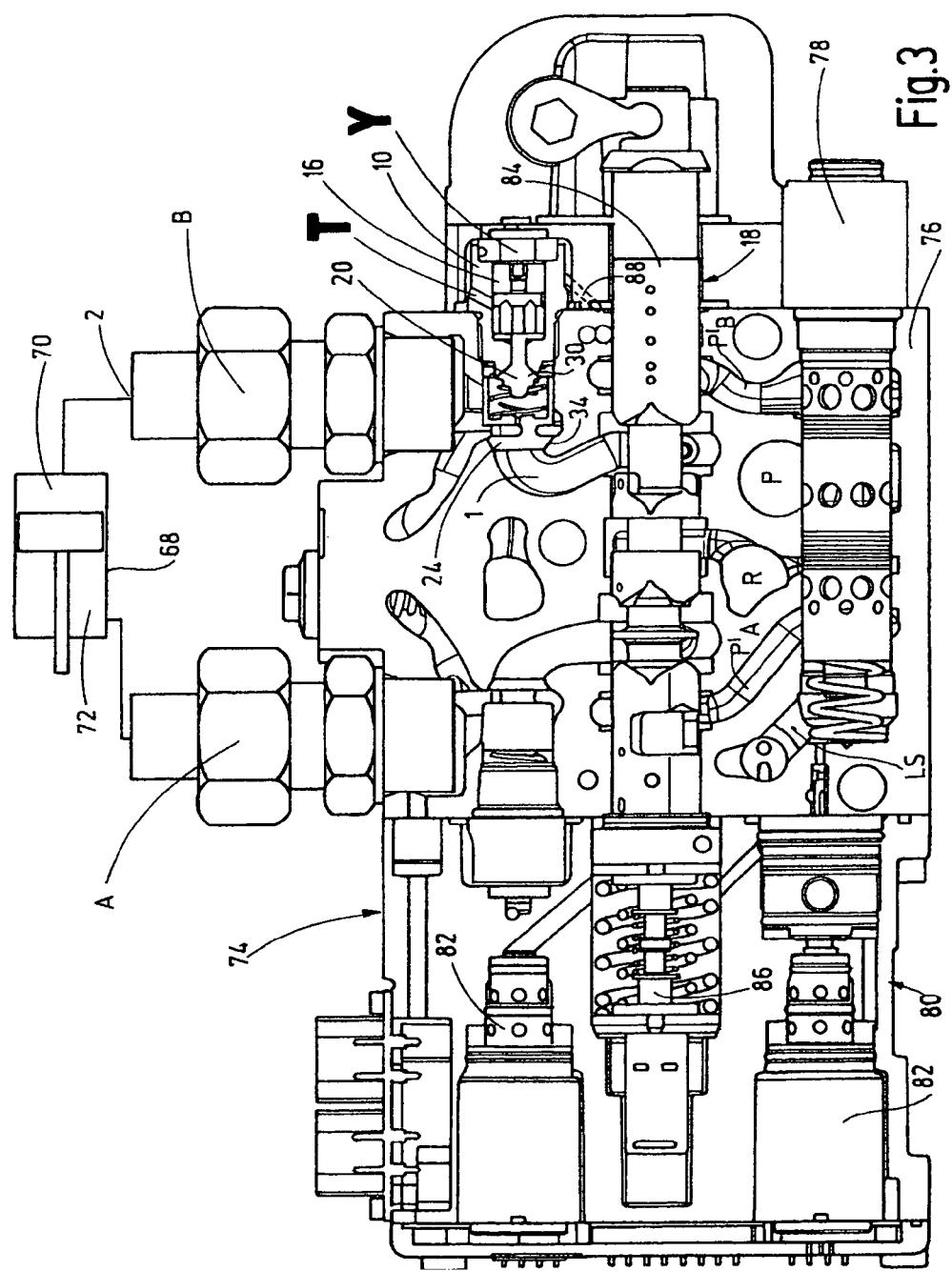
FIG. 3 is a front elevational view of the valve device of FIG. 1 installed in a conventional directional valve arrangement.

The hydraulic valve device shown in FIG. 1 has a valve housing 10 which can be secured as a screw-in cartridge over a screw-in distance or thread 12 on housing parts 14 of a third component, for example, in the form of a directional valve (see FIG. 3). In the valve housing 10, an activation piston 16 is guided to be able to move lengthwise or along the housing longitudinal axis and activates a pilot valve 20 in an actuatable manner by an actuating device 18 (FIG. 3). By pilot valve 20, valve a fluid port T in the form of a low pressure or tank port in the valve housing 10 can be connected to a fluid chamber 22 of a shut-off piston 24. A fluid-carrying connecting line 1, 2 of the valve device can be activated by the shut-off piston 24. The shut-off piston 24 furthermore has a fluid-carrying control line 26 discharging into the fluid chamber 22 of the shut-off piston 24 from the connecting line 1, 2. The actuating device 18 has a fluid activation line Y which routes the unlocking pressure of the actuating device 18 to the back of the activation piston 16. How the fluid activation line Y is exposed to the unlocking pressure is detailed below.

As FIG. 1 furthermore shows, by a first energy storage device 28 in the form of a compression spring, the pilot valve 20 is movably held or biased in the direction of a pilot valve seat 30 of the valve housing 10. By a second energy storage device 32, likewise in the form of a compression spring, the shut-off piston 24 can be moved or biased in the opposite direction onto a second or shut-off valve seat 34 bordering the fluid-carrying connecting line 1, 2 as a wall part. The two energy storage devices 28, 32 are routed or located within the fluid chamber 22. The second energy storage device 32 in the form of a compression spring encompasses the first energy storage device 28 with its assignable compression spring. The first energy storage device 28 is supported with its one free end on the inside of the shut-off piston 24 and with its other end adjoining the end side of the pilot valve 20. The second energy storage device 32 is likewise supported on the same inner side of the shut-off piston 24 and with its other end adjoins the free end side of the valve housing 10 connected to the fluid chamber 22 to carry fluid and forms a boundary wall of the fluid chamber. In this respect, the indicated face-side boundary wall forms a stop 36 which the shut-off piston 24 can strike in its rightmost travel position with its released enclosure wall 38.

At the site at which the fluid-carrying control line 26 discharges into the fluid chamber 22 of the shut-off piston 24, a discharge site 40 is provided which can be closed by the free face end of the pilot valve 20. For this termination, the discharge site 40 is conically widened toward the fluid chamber 22 of the shut-off piston 24. The pilot valve 20 on its free face side has a spherical closing cap 42 which can engage the discharge site 40 to form a seal. A throttle site 44 in the form of a throttle bore is located between the discharge site 40 and the other portion of fluid-carrying control line 26. The spherical closing cap 42 of the pilot valve 20 on its bottom has a conically extending sealing surface 46 which can be brought into contact with an additional conical sealing surface 48 of the valve housing 10, for obtaining a line-shaped sealing site 50. For the first valve seat 30, the incline of the other sealing surface 48 is chosen to be smaller than that for the sealing surface 46 of the pilot valve 20. In the closed state of the valve device as shown in FIG. 1, the first energy storage device 28 presses the pilot valve 20 against the first valve seat 30.

The pilot valve 20 has a bridge-shaped extension 52 that establishes a connection between the pilot valve 20 and the activation piston 16. This connection can be in one piece. The inherently cylindrical activation piston 16 has through bores 54 discharging into the cross channel 56 which emerges in turn into an annulus 58. In each travel position of the activation piston 16, annulus 58 has a fluid-carrying connection to the fluid port T within the valve housing 10. The bridge-shaped extension 52 is routed in a widened through channel 60 in the valve housing 10 so that with the pilot valve 20 open, the first or pilot valve seat 30 is released, forming a fluid-carrying connection between a part 2 of the connecting line 1, 2 and the fluid port T, via the fluid-carrying control line 26, the throttle site 44, the discharge site 40, the fluid chamber 22, the through channel 60, the through bores 54, the cross channel 56, and the annulus 58.

The fluid activation line Y is permanently connected to the chamber space 64 of the activation piston 16 via a throttle connection site 62 to carry fluid. The chamber space 64, as already described, with the pilot valve 28 open, establishes a fluid connection between the fluid port T in the valve housing 10 and the fluid chamber 22 of the shut-off piston 24. For a fluid-carrying connection of the chamber space 64 to the throttle connection site 62, in turn the cross channel 56 and the annuli 58 made in the lengthwise direction and located opposite one another diametrically to the longitudinal axis of the pilot valve 20 are used. Also, the annulus 58 is separated fluid-tight from the chamber space 64 via a periphery-side widening 66 on the outer periphery of the activation piston 16.

To activate hydraulic equipment, in this case in the form of a hydraulic working cylinder 68, part 2 of the connecting line 1, 2 is connected to the piston side 70 of the working cylinder 68 to carry fluid. The rod side or space 72 is in turn connected to a hydraulic control device (not detailed) and omitted for the time being for the following simplified examination of operation. Depending on the actuating situation of the actuating device 18, for operation of the device, part 1 of the connecting line 1, 2 is connected to a pressure supply source, for example, in the form of a hydraulic pump by a pressure supply port P (see FIG. 3), or the actuating device 18 switches part 1 of the connecting line 1, 2 so as to be unpressurized, by part 1 being connected to a return port R.

At this point, for better understanding, the manner of operation of the hydraulic valve device as shown in FIG. 1 will be detailed below. To lift a load, the hydraulic working cylinder 68 on the piston side 70 must be activated so that the cylinder can be extended. For this process, the pressure-carrying part 1 of the connecting line 1, 2 must be connected to part 2 connected to the piston side 70 to carry fluid. The rising pressure in part 1 as the inflow exceeds the prevailing load pressure in part 2 of the port of the piston side 70 causes the shut-off piston 24 to be moved to the right against the action of the second energy storage device 32, as viewed in the direction of FIG. 1. A volumetric flow begins to flow from part 1 to part 2, and the shut-off piston 26 opens until equilibrium of forces has been established as a result of the pressure drop on the second or shut-off valve seat 34. In the opening motion, the shut-off piston 24, according to its stroke volume in the fluid chamber 22, pushes oil from its back via the throttle site 44 into the load pressure space partially formed by part 2 of the connecting line 1, 2. The maximum opening stroke is limited by the shut-off piston 24 striking the stop 36 of the valve housing 10.

To lower the load by the piston rod unit of the working cylinder 68 being retracted again in the direction of the piston side or space 70, a corresponding unlocking pressure is applied in the fluid activation line Y to move the activation piston 16, as viewed in the direction of FIG. 1, from right to left. By that activation piston movement, the pilot valve 20 is moved to the left by the extension 52. The pilot valve 20 then clears the first valve seat 30. With this opening of the fluid path via the through channel 60, the pressure on the back of the shut-off piston 24 and therefore in the fluid chamber 22 is suddenly reduced. A corresponding control oil flow also flows to the fluid port T in the valve housing 10. At the same time, the shut-off piston 24 moves toward the pilot valve 20, and the shut-off piston 24 is set directly on the pilot valve 20. The discharge site 40 and therefore the throttle site 44 are closed fluid-tight. The leak flow flowing briefly to the fluid port T is then shut off. The high opening force of the load pressure prevailing on the piston side 70 of the working cylinder 68 acts on the free annular surface on the shut-off piston 24 and moves the pilot valve 20 back to the right in its direction to block the valve seat 30. When the shut-off piston 24 is, however, stationary on its stop, the pilot valve 20 is still open, and the back of the shut-off piston 24 with its fluid chamber 22 remains connected to the fluid port T.

Even with leading loads, unblocking is not adversely affected and can be reliably carried out. With the valve device according to the invention, a secondary leak flow with uncontrolled lowering motion by a second seat valve between the pilot valve and shut-off piston, as shown to some extent in the prior art, is definitely avoided. The lowering motion is induced only by the actuating device 18 and is reliably carried out. Otherwise, the matching between the throttle site 44 in the shut-off piston 24 with the relief channels is not critical because the throttle connecting site 44 is immediately closed again after opening by means of the pilot valve 20. Therefore, back pressures cannot form in the relief line and on the back. In this respect, at very low load pressures on the working cylinder 68, the shut-off piston 24 can also be raised without delay off its second valve seat 34 to ensure unobstructed fluid return from part 2 to part 1 of the connecting line 1, 2. In this return case, part 1 of the connecting line 1, 2, as already described, is to be connected to the return port R by an actuating device 18.

The use of a pilot-operated check valve according to the aforementioned description is detailed below using a directional valve solution shown in FIG. 3 as part of the hydraulic valve device. In this respect, the relationships of the pilot-operated check valve with the actuating device 18 is detailed. FIG. 3 shows a directional valve 74. This directional valve structure is conventional in the prior art so that it will not be described in detail, but only as necessary for understanding of the check valve solution according to the invention. The directional valve 74 has a multi-part control housing 76 with a plurality of fluid lines and fluid ports. The fluid port arrangement, among other contributory factors, has a pressure supply port P, a return port R, a section-load sensing port LS, two control ports P'$_A$ and P'$_B$, as well as two working ports A, B. A pressure compensator 78 connected upstream of the individual fluid ports is used to activate the indicated fluid port arrangement.

A control device 80, in the conventional manner (not described in detail) has two pilot control valves 82 used, among other purposes, to activate a control piston 84 shown in FIG. 3 in its undeflected middle or neutral position. This middle or neutral position can also be supported by a spring storage device 86. The hydraulic working cylinder 68 is connected in turn to the working ports A, B. The piston side 70 in turn is connected to part 2 of the connecting line 1, 2 to carry fluid via the working port B. The rod space or side 72 is connected to the working port A by a fluid-carrying connecting line so that the directional valve 74 can also activate the rod side accordingly. For the working ports A, B, the pilot-operated check valve is connected upstream according to the solution as shown in FIG. 1.

For the process of lifting a load or the extension process of the piston rod unit, the control piston 84 is moved to the right by the actuating device 18, viewed in the direction of FIG. 3. Part 1 of the connecting line 1, 2 is connected to the control port P'$_B$ to carry fluid. As a result of the associated inflow pressure, the shut-off piston 24 opens and the supply pressure P'$_B$ prevails on the working port B. In this extension motion, the oil volume is displaced out of the rod space or side 72 via the working port A. By unblocking the check valve responsible for the working port A, the draining amount of oil thus travels in the direction of the return port R. If the piston rod unit is to be retracted in the direction of the piston side 70, under the influence of the actuating device 18 activated by an operator, the control piston 84 is moved from right to left and part 1 of the connecting line 1, 2 connected to the return port R and is switched essentially unpressurized. The control pressure prevailing on P'$_B$ is then relayed to the fluid activation line Y via the cross channel 88, and then the unblocking process is carried out. Alternatively, the cross channel 88 can be connected to the lower pressure of the control circuit or directly to the pressure output of the pilot control valves 82. The hydraulically pilot-operated check valve responsible for the working port A then undertakes pressure supply for the retraction process by the pressurized control port P'$_A$. In this respect, the control pressure in the control port P'$_A$, if necessary is also used to initiate the described unblocking process on the back of the check valve for the working port A.

The control piston 84 of the directional valve 74 is also referred to as a control slide in the technical jargon. As an actuating device 18, an actuating magnet (not detailed) can replace the fluid activation line Y, for example, in the form of a proportional magnet. When electrically energized, an actuating magnet activates the activation piston 16 with the pilot valve 20 for hydraulic unblocking. The purely fluidic solution presented here, however, has the advantage that actuating current need not be made available for use of the directional valve 74, except for the pilot control valves 82. As already explained in the foregoing, the pilot-operated check valve can be used as a hydraulic valve device only for activation of the working port and a hydraulic consumer. The illustrated hydraulic working cylinder 68 can also be replaced by another hydraulically actuatable working device, for example, in the form of a hydraulic pivoting motor (not shown) and the like.

Figure 2:
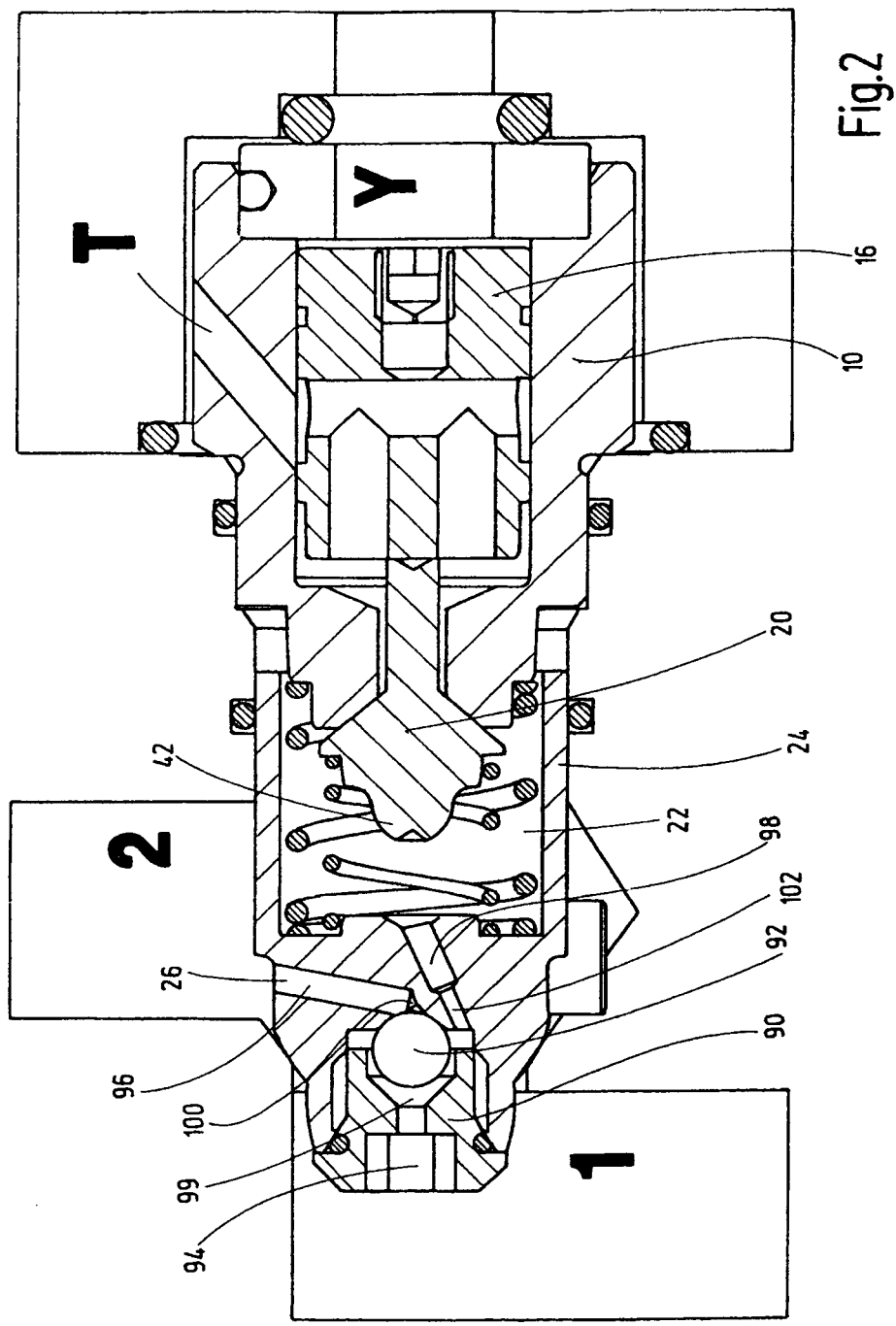
FIG. 2 is a side elevational view in section of a hydraulic valve device according to a second exemplary embodiment of the invention.

The altered embodiment as shown in FIG. 2 is explained only to the extent it differs dramatically from the embodiment as shown in FIG. 1. The same components are identified with the same reference numbers, and the same descriptions apply. The altered embodiment shown in FIG. 2 is modified such that, on the left free end of the shut-off piston 24, an additional valve device 90 is used. Valve device 90 has a valve part 92 in the form of a closing ball which, routed in the wall parts of the shut-off piston 24, activates a connecting site 94 to part 1 of the connecting line 1, 2 in terms of fluid flow. The fluid-carrying control line 26 is divided within the shut-off piston 24 into two or first and second fluid-carrying branches 96, 98, as shown in FIG. 2. The valve part 92 can shut off the branch 96 to part 2 of the connecting line 1, 2 by engaging valve device seat 91.

If the pilot-operated check valve of FIG. 2 is to be opened, that is, if a fluid-carrying connection is to be established between the parts 1 and 2 of the connecting line 1, 2, first of all the inflow pressure in part 1 prevails in the fluid chamber 22 via the valve device 90 and the second branch 98. In this respect, the valve part 92 shuts off only the first branch 96. Since the pressure in the fluid chamber 22 corresponds to the inflow pressure in part 1 of the connecting line 1, 2, the shut-off piston does not open. Only when the pilot valve seat-sealed in this way is actively opened or unblocked on the back, as described, by the fluid activation line Y or an actuating magnet, the shut-off piston 24 by movement to the right as viewed in FIG. 2 also opens the fluid path from part 1 to part 2 of the connecting line 1, 2 because the pressure in the fluid chamber 22 can be relieved to the port line T.

In addition to this defined opening process, closing and passively keeping closed are also improved. If, when the load is lowered or the piston rod unit is retracted into the working cylinder 68, in the valve position shown in FIG. 2 a higher fluid pressure in part 2 of the connecting line 1, 2 is present. This higher fluid pressure acts via the first branch 96 on the valve part 92 moving valve part 92 to the left within the valve chamber 99 to close the connecting or port site 94. In this way, the two branches 96, 98 are then connected to one another to carry fluid, and the fluid pressure in part 2 also prevails in the fluid chamber 22. If, in turn, the corresponding unblocking is carried out via the actuating device 18, in turn the shut-off piston 24 opens in the already described manner, and the fluid pressure in part 2 is transferred to part 1 of the fluid line 1, 2. Part 1 is connected to the largely unpressurized return port R of the directional valve 74 to carry fluid via the control piston 84 of the actuating device 18. For the described activation processes, the two fluid-carrying branches 96, 98 each have a throttle site formed by a cross section reduction 100, 102.

Thus the hydraulic valve device according to the invention is tight in both flow directions. A double seat-sealed pilot-operated check valve is formed. The alternative embodiment shown in FIG. 2 with the corresponding installation position can in turn replace the pilot-operated check valves shown in FIG. 3 and can lead to improved operation of the directional valve 74 in the described scope.

While various embodiments have been chosen to illustrate the invention, it will be understood by those skilled in the art that various changes and modifications can be made therein without departing from the scope of the invention as defined in the appended claims.

What is claimed is:
1. A hydraulic valve device, comprising:
 a control valve housing having at least one fluid-carrying connecting line therethrough with first and second parts and with a shut-off valve seat, having a control piston and having a fluid chamber with a central longitudinal axis;

a pilot valve housing being coupled to said control valve housing and having a pilot seat and a fluid port;

a pilot piston movably mounted in said pilot valve housing toward said pilot valve seat into closed position disconnecting said fluid chamber from said fluid port and away from said pilot valve seat into an open position connecting said fluid chamber with said fluid port;

an actuating device coupled to said pilot piston to move said pilot piston in said pilot valve housing away from said pilot valve seat, said actuating device having at least one of an actuating magnet and an activation line with a fluid activation piston pressurizable by said control piston;

a first energy storage device in said fluid chamber engaging and biasing said pilot piston toward said pilot valve seat;

a shut-off valve in said control valve housing having a shut-off piston movably mounted in said fluid chamber of said control valve housing toward and away from said shut-off valve seat to connect and disconnect said first and second parts of said connecting line, respectively, said shut-off piston having a fluid-carrying control line discharging from said connecting line into said fluid chamber, said pilot piston and said shut-off piston being movable parallel to one another and in opposite directions toward the respective valve seat thereof, said pilot piston being located on a back of said shut-off piston and on a central longitudinal axis of shut-off piston and projecting into said fluid chamber when seated on said pilot valve seat, said pilot piston being able to close discharge of said control line into said fluid chamber; and a second energy storage device in said fluid chamber biasing said shut-off piston toward said shut-off valve seat, said first and second energy storage devices, said shut-off piston, said pilot piston and said actuation device being coaxial to said central longitudinal axis of said fluid chamber.

2. A hydraulic valve device according to claim 1 wherein said control line comprises first and second branches, each of said first and second branches having a first end discharging into a valve chamber of a valve device in said shut-off piston, an opposite second end of said first branch discharging into said fluid chamber, an opposite second end of said second branch discharging into one of said parts of said connecting line.

3. A hydraulic device according to claim 2 wherein said valve device in said shut-off piston comprises a valve part movable within a wall of said shut-off piston to open and close a connecting site of one of said branches to said connecting line.

4. A hydraulic device according to claim 2 wherein said valve part is a valve ball.

5. A hydraulic device according to claim 1 wherein said fluid port is a low pressure port.

6. A hydraulic device according to claim 5 wherein said low pressure port is a tank port.

7. A hydraulic device according to claim 1 wherein said actuating device comprises said activation piston and a fluid activation line permanently connected to a chamber space receiving said activation piston in said pilot valve housing, said activation line being connected to said chamber space by a throttle connection site to carry fluid.

8. A hydraulic device according to claim 1 wherein said control piston activates a device connected to at least one working part to move said shut-off piston toward and away from shut-off valve seat.

9. A hydraulic device according to claim 8 wherein at least one said shut-off piston activated by a respective one said pilot piston is provided for each working port activated by said control piston.

10. A hydraulic device according to claim 1 wherein said first and second storage devices comprise first and second springs, respectively.

* * * * *